United States Patent Office 3,655,709
Patented Apr. 11, 1972

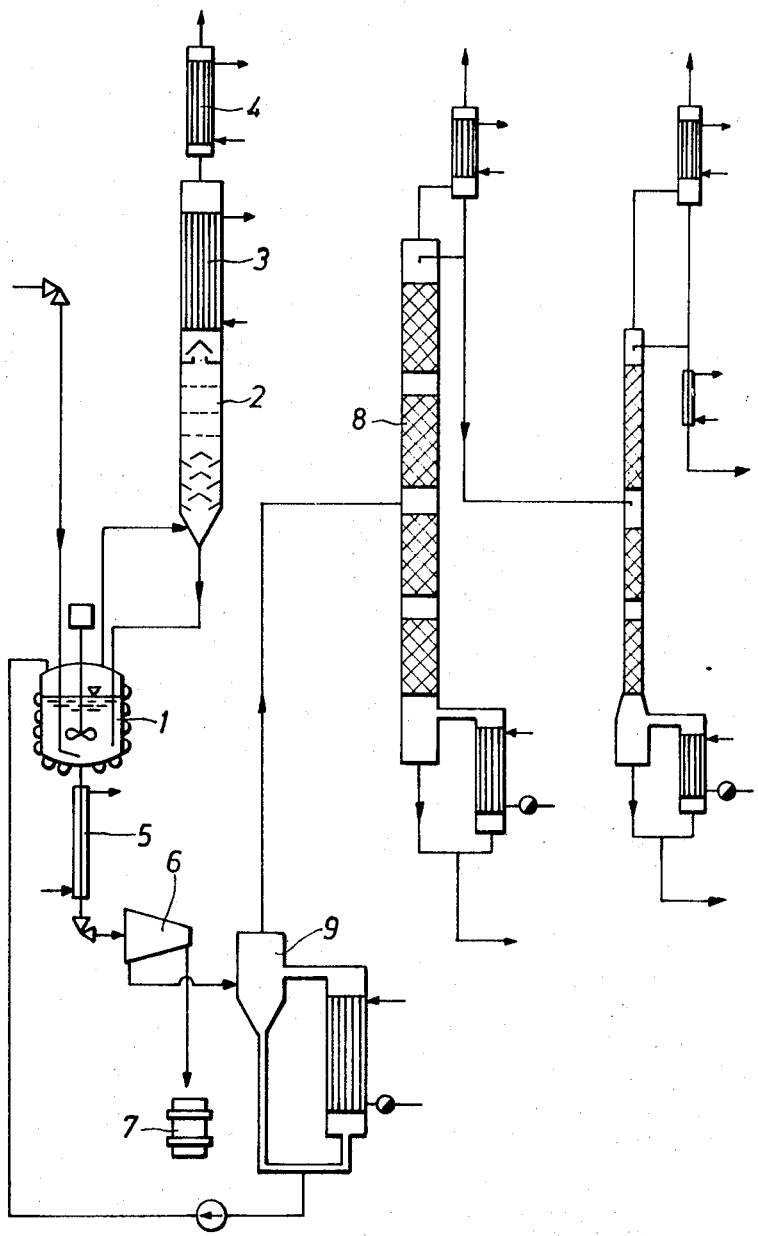

3,655,709
PROCESS FOR THE MANUFACTURE OF ARYL-CHLOROSILANES IN ACCORDANCE WITH THE ROCHOW SYNTHESIS
Ludwig Fries, Odenthal-Hahnenberg, Rudolf Mundil, Leverkusen, and Herbert Wiechers, Opladen, Germany, assignors to Farbenfabriken Bayer Aktiengesellschaft, Leverkusen, Germany
Filed Sept. 14, 1970, Ser. No. 72,065
Claims priority, application Germany, Oct. 11, 1969, P 19 51 410.4
Int. Cl. C07f 7/16
U.S. Cl. 260—448.2 T                      6 Claims

ABSTRACT OF THE DISCLOSURE

In the manufacture of arylchlorosilanes in accordance with the Rochow synthesis by reaction of aryl halides with silicon, the reaction products leaving the reaction vessel are completely condensed, and the condensate, containing solids, is separated by means of a decanter into a liquid phase free of solids and a solid largely free of liquid, with the liquid phase being worked-up in accordance with processes which are in themselves known.

---

The present invention is directed towards a process for the manufacture of arylchlorosilanes according to the Rochow synthesis by reaction of aryl halides with silicon.

In the known process for the manufacture of arylchlorosilanes according to the Rochow synthesis by reaction of aryl halides with silicon, the reaction gases also carry solid silicon from the reaction vessel in addition to unreacted aryl halides. In order to obtain the crude product, the condensation is followed by evaporation of the chlorobenzene, and the residue containing the product, together with the silicon sludge, is run off into containers. Here the sludge settles out and after a prolonged settling time, found by experience, the liquid crude product is carefully withdrawn and then passed to the subsequent working-up by distillation.

This prior process is involved, expensive as regards apparatus, and suffers from some important unpleasant disadvantages, for example that a large storage space is required since the entire production must be temporarily stored for the duration of the settling time. This means, in addition to greater expense, also an increased operating hazard through the high loss of inflammable substance, but also through the difficulties which occur on emptying and cleaning the settling vessels, such as the requisite exclusion of moist air, water and the like. The sedimentation only occurs slowly since the silicon is very finely granular and the high carbon content which results from cracking processes during the reaction further reduces the differences in weight between solid and liquid. The residue obtained as a sludge has a very high liquid content, that is to say product content. Very long settling times cause undesired after-reactions in the crude product, in the form of rearrangements of valuable products to undesired products, since the solid also carries a part of the catalyst, which favours the rearrangement, with it out of the reaction vessel. These after-reactions can also not be completely suppressed by the addition of stabilising agents and result in a significant loss in yield. If the settling times are kept short, a high solids content still remains in the liquid. This solids content leads to sludge formation in the sumps of the subsequent distillation columns and makes necessary frequent cleaning of the distillation vessels. High output evaporators can for this reason not be employed here.

The above-mentioned difficulties are avoided if, according to the invention, the reaction products leaving the reaction vessel, which take a part of the solids with them, are completely condensed and the entire condensate containing solids is separated by means of a decanter into a liquid phase free of solids and a solid which is largely free of liquids, and the liquid is worked-up in accordance with processes which are in themselves known.

This simultaneously offers several advantages: as a result of the content of unreacted aryl halides in the condensate, the specific gravity and also the viscosity of the liquid phase becomes less and hence the difference in density between solid and liquid, and also the sedimentation speed, becomes greater.

According to a further development of the process according to the invention, the solid is rinsed in the decanter with a suitable wash liquid, for example chlorobenzene, whereby remaining product contents are replaced by the liquid. According to a further special embodiment of the process circulatory evaporators (high output evaporators) are employed when working-up the liquid phase by distillation.

The invention prefers a further special embodiment of the process which is characterised in that the liquid phase withdrawn in the decanter is transferred into a concentrator and the solids condensate which thereby becomes enriched in the sump of the concentrator is again passed to the decanter, continuously or batchwise, via the condensate collecting vessel.

Optimum conditions result, because the separation process and wash process take place continuously. The crude product is completely isolated, since the solid is obtained with low residual moisture which consists of wash liquid with which the solid has been eluted in the decanter. The crude product is passed directly without intermediate storage, to the subsequent working-up by distillation. Thus the material flow in the working process is reduced to a minimum. The yield of the total process is improved as a result of the dwell times of the solid residue in the crude product, which have been reduced to a minimum. The special addition of stabilising agents is no longer required. The solid is simply charged into vessels and destroyed. The separation of solid and liquid phase takes place so effectively in the decanter that in the subsequent working-up by distillation high output evaporators, for example circulatory evaporators, can be employed.

The process according to the invention will be described by way of an example in relation to a schematic drawing:

The reaction gases coming from the reactor (chlorobenzene, Ph-silanes, benzene, SiCl$_4$ and inert gases) are freed of pressure in the condensate collector 1, there release their heat content resulting from being superheated and pass through the wash tower 2 into the condenser 3. The condensate flows through the wash tower 2 in countercurrent to the rising vapours, there washes the solids particles, which have been entrained, out of the vapours, and is collected in the condensate collector 1. The residual gases escape through the gas cooler 4.

From the condensate collector 1 the liquid flows in a controlled manner, via an after-cooler 5, to the decanter 6. The sludge issuing from the decanter 6 drops into drums 7 and is transported away to be destroyed.

For further working-up by distillation, the clear liquid obtained in the decanter 7 is either directly passed to the column 8 or, in the case where the clear liquid still contains very small admixtures of solid, is passed into the concentrator 9. In the concentrator 9, which is constructed in the form of a circulatory evaporator, the crude product which is not yet entirely clear is thickened approximately to the concentration of solids content wihch the liquid displays before the decanter 6. The crude product vapour which has been entirely freed of solid admixtures passes into the column 8. The thickened liquid is returned into the condensate collector 1 and again passes, with the fresh crude product, into the decanter 6, in which a part of the very finest particles also always again deposits as a result of the entraining action of the coarser solid particles, so that no enrichment of these fine particles occurs.

In operating an installation in accordance with the process according to the invention, the following average values were for example obtained in continuous operation:

Amount of crude product: 1000 kg./hour
Solids content in the crude product: 4-7%
Solids content in the clear liquid after the decanter: 0.1-0.3%
Solids content in the solid after the decanter: 15-30%.

The variable solids conditions in the reactor, such as different particle size, different loading with carbon, and different reaction conditions, cause a corresponding breadth of variation in the results achieved.

We claim:

1. Process for the manufacture of arylchlorosilanes according to the Rochow synthesis by reaction of aryl halides with silicon, characterised in that the reaction products leaving the reaction vessel, which carry a part of the solids with them, are condensed and that the entire condensate containing solids is separated by means of a decanter into a liquid phase which is free of solids and a solid which is largely free of liquid, and that the liquid is worked-up in accordance with processes which are in themselves known.

2. Process according to claim 1 characterised in that in the decanter the solid is rinsed with a suitable wash liquid, whereby residual product contents are replaced by wash liquid.

3. Process according to claim 1 characterised in that circulatory evaporators (high output evaporators) are employed when working-up the liquid phase by distillation.

4. Process according to claim 1 characterised in that the liquid phase withdrawn in the decanter is passed to a concentrator and that the solids condensate which thereby becomes enriched in the sump of the concentrator is again passed, continuously or batchwise, to the decanter via the condensate collecting vessel.

5. Process according to claim 2, characterised in that circulatory evaporators (high output evaporators) are employed when working-up the liquid phase by distillation.

6. Process according to claim 2 characterised in that the liquid phase withdrawn in the decanter is passed to a concentrator and that the solids condensate which thereby becomes enriched in the sump of the concentrator is again passed, continuously or batchwise, to the decanter via the condensate collecting vessel.

References Cited
UNITED STATES PATENTS

| | | | |
|---|---|---|---|
| 2,380,998 | 8/1945 | Sprung et al. | 260—448.2 T X |
| 2,380,999 | 8/1945 | Sprung et al. | 260—448.2 T X |
| 2,389,931 | 11/1945 | Reed et al. | 260—448.2 T X |
| 2,449,821 | 9/1948 | Sellers et al. | 260—448.2 T |
| 3,133,109 | 5/1964 | Dotson | 260—448.2 T |

OTHER REFERENCES

Noll: "Chemistry and Technology of Silicones," Academic Press, New York (1968), pp. 35-37.

Voorhoeve: "Organohalosilanes," Elsevier Publishing Co., New York (1967), pp. 330-342.

TOBIAS E. LEVOW, Primary Examiner

P. F. SHAVER, Assistant Examiner